United States Patent [19]

Schrader

[11] Patent Number: 4,729,483
[45] Date of Patent: Mar. 8, 1988

[54] DECK MEMBER FOR STORAGE RACK

[75] Inventor: Donald E. Schrader, Nashville, Tenn.

[73] Assignee: Nashville Wire Products Mfg. Co., Inc., Nashville, Tenn.

[21] Appl. No.: 569,453

[22] Filed: Jan. 9, 1984

[51] Int. Cl.$^4$ .................................................. A47F 5/00
[52] U.S. Cl. .................................... 211/153; 211/134; 108/51.1; 108/52.1
[58] Field of Search ............... 211/153, 134, 135, 191, 211/187; 108/51.1, 52.1, 55.3

[56] References Cited

U.S. PATENT DOCUMENTS

| | | | |
|---|---|---|---|
| 2,265,790 | 12/1941 | Young | 211/153 |
| 3,086,660 | 4/1963 | Steele | 211/153 X |
| 3,802,574 | 4/1974 | Weider | 211/134 |
| 3,915,101 | 10/1975 | Onori | 211/191 |
| 3,981,249 | 9/1976 | Herrmann et al. | 108/52.1 |
| 4,056,195 | 11/1977 | Keith | 211/153 |
| 4,216,729 | 8/1980 | Schrader | 211/191 |

OTHER PUBLICATIONS

General Motors Drawing, 11-17-1982.

Primary Examiner—Ramon S. Britts
Assistant Examiner—Blair M. Johnson
Attorney, Agent, or Firm—Harrington A. Lackey

[57] ABSTRACT

A deck member for a storage rack in which the front and rear portions of the deck member are provided with the front and rear planar platform surfaces including corresponding upwardly projecting transverse front and rear ridge mebers having a front-to-rear spacing slightly greater than the front-to-rear dimension of a storage container received on the deck member, to retain the storage container upon the deck member.

6 Claims, 5 Drawing Figures

DECK MEMBER FOR STORAGE RACK

BACKGROUND OF THE INVENTION

This invention relates to storage racks, and more particularly to a deck member for a storage rack.

In certain types of storage racks in material handling storage systems, a storage bay may consist of front and rear transverse beams supported upon upright posts, and a plurality of elongated support members spanning and resting upon the top ledges of the respective front and rear beams.

Deck members of various types may be supported upon the longitudinal support members.

One specific form of a deck member may be a wire shelf which is welded to a plurality of elongated support channels, the opposite end portions of which rest respectively, upon the front and rear beams. Most deck members are made of a mesh of wire rods disposed in a substantially horizontal plane for supporting storage containers of various types.

However, because of vibration of the storage racks, inaccurate positioning of the containers upon the shelf members or upon the tines of the forklift retrieval systems, or because of over-positioning of the loaded container, such containers may inadvertently slide, or be thrust, over the front or rear edge of the shelf member.

Storage and retrieval systems incorporating the deck members and storage racks described above, may constitute a huge complex in a warehouse. Such storage and retrieval systems are generally in substantially constant operation. The movement of the forklift trucks or the automated forklift system, as well as the large loads which are handled in the system, can create substantial vibration sufficient to cause loaded containers to creep or slide out of position relative to their deck members.

SUMMARY OF THE INVENTION

It is therefore an object of this invention to provide a deck member having an especially constructed shelf member or platform for retaining the loaded containers upon the deck member.

The deck member made in accordance with this invention includes a shelf member having a top surface for supporting a loaded container, and a transverse ridge member projecting upwardly from the top surface to limit the front or rear movement of the container relative to the deck member.

More specifically, the shelf member made in accordance with this invention includes a front planar sheet member including an upward projecting front ridge, preferably arcuate in cross-section and convex upward, spanning the front portion of the deck member, and a transverse rear ridge member of substantially the same construction as the front ridge member projecting upward from a rear sheet member. The front and rear ridge members are longitudinally spaced a distance slightly greater than the front-to-rear dimensions of the bearing support members of the loaded container, such as the bottom of the container, or the bearing feet of the container.

The cross-sections of the front and rear ridge members are preferably arcuate and convex upward to provide cam surfaces for deflecting upward the tines of a forklift device carrying a loaded container, or for deflecting the loaded containers themselves in case of inadvertent engagement or interference between the tines or the loaded containers on the one hand and the ridges on the other hand.

DESCRIPTION OF THE PREFERRED EMBODIMENT

Figure 1:
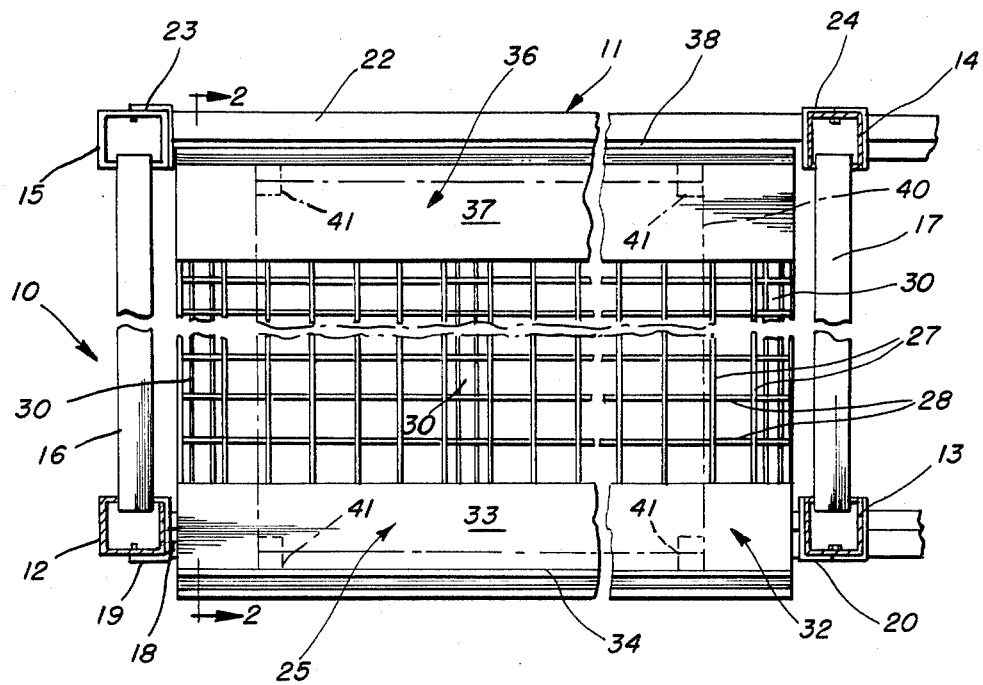
FIG. 1 is a top plan view of a deck member made in accordance with this invention supported in the bay of a storage rack, and illustrating a loaded container supported on the deck member, in phantom.

Referring now to the drawings in more detail, FIG. 1 discloses a storage rack 10, including a bay 11 having four upright posts 12, 13, 14 and 15, a side beam 16 connecting the posts 12 and 15 and an opposite side beam 17 connecting the posts 13 and 14. A front offset beam 18 is adjustably supported between the front posts 12 and 13 by means of brackets 19 and 20 of conventional construction. A rear offset beam 22 is connected at its opposite ends by brackets 23 and 24 to the rear posts 15 and 14, respectively.

Adapted to be supported upon the front offset beam 18 and the rear offset beam 22 in a bay 11 is a deck member 25, made in accordance with this invention, preferably including a shelf member of wire mesh or wire grid. A plurality of uniformly spaced, parallel wire rods 27 extend front-to-rear and are rigidly secured to underlying, transversely extending, elongated parallel and uniformly spaced wire rods 28, in the shelf member. Fixed to, such as by welding, the bottom surfaces of the transverse wire rods 28 of the shelf member are a plurality of transversely spaced, longitudinal channel support members 30 of known construction.

Secured to the top surfaces of the upper longitudinal wire rods 27, such as by welding, is an elongated, transversely extending, front retainer sheet 32 having a substantially horizontal, planar top bearing surface 33 and an elongated, transversely extending, front retainer ridge 34. The front retainer sheet 32 may also include a front depending flange or apron 35, projecting downward from the front edge of the front retainer sheet 32 in front of the wire rods 27 and 28 and in front of the front offset beam 18.

Secured to the top surfaces of the rear portions of the longitudinal wire rods 27, such as by welding, is an elongated, transversely extending, rear retainer sheet 36 having a substantially horizontal planar top bearing surface 37, and an elongated, transversely extending rear retainer ridge 38. The rear retainer sheet 36 may also be provided with a rear depending flange or apron 39, projecting downward below the wire rods 27 and 28 and behind the rear offset beam 22.

The top bearing surfaces 33 and 37 of the respective front and rear retainer sheets 32 and 36 are disposed in the same horizontal plane, and preferably spaced apart longitudinally of the deck member 25. The bearing surfaces 33 and 37 could continue and merge with each other to form a solid bearing surface covering the entire deck member 25, if desired. However, substantial metal may be saved in the fabrication of the deck member 25 by foreshortening the bearing surfaces 33 and 37, as disclosed in FIGS. 1 and 2.

Figure 2:
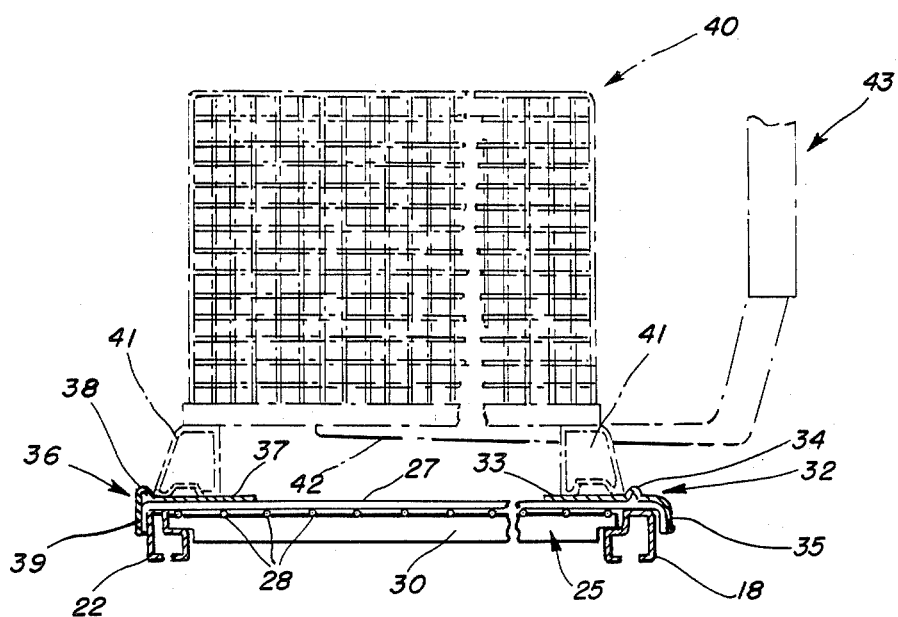
FIG. 2 is a section taken along the line 2—2 of FIG. 1, showing the container in loaded position, and illustrating the tines of a forklift device, in phantom.

The bearing surfaces 33 and 37 must be large enough in area to be engaged for load bearing support of the bottom portion of a container, such as the wire basket or wire container 40 disclosed in FIG. 2, which containers are usually loaded when stored in the storage rack 10.

As disclosed in FIG. 2, the wire container 40 is provided with supporting feet 41, which rest directly upon the top bearing surfaces 33 and 37.

Figure 3:
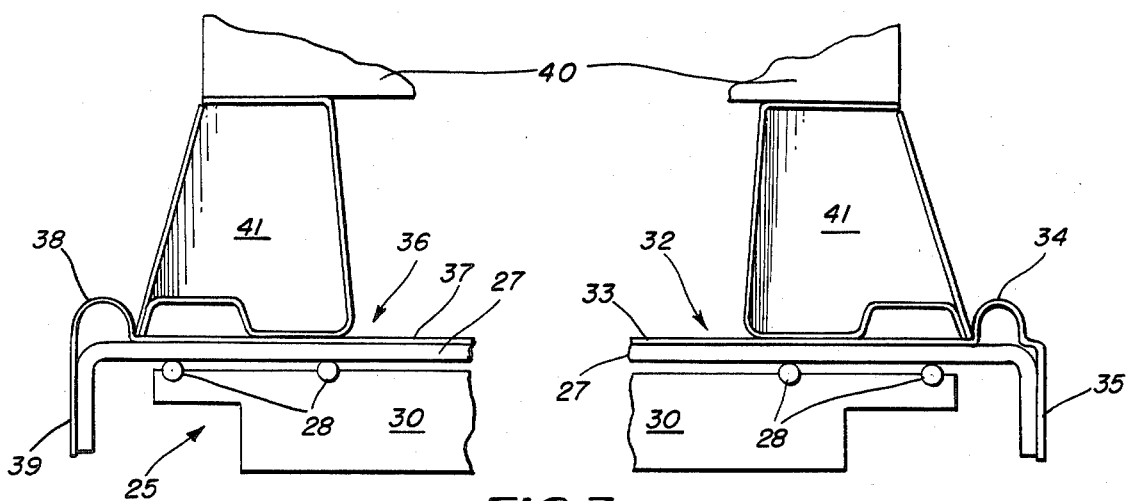
FIG. 3 is an enlarged side elevational view of the sheet members of the shelf member supporting the feet of a wire storage basket, with portions broken away.

The front retainer ridge 34 and the rear retainer ridge 38, must be spaced apart longitudinally, or front-to-rear, by a distance slightly greater than the front-to-rear distance between the extremities of the supporting surfaces or supporting members, such as the feet 41 of the container 40. As disclosed in FIG. 3, the front edge or extremity of the front supporting members or feet 41 preferably abut or engage the opposed rear surface of the front retainer ridge 34, while the rear edge of the rear supporting member or feet 41 also preferably engage or abut the front surface of the rear retainer ridge 38. Thus, the container 40 is supported upon the deck member 25 with the retainer ridges 34 and 38 outside of the feet 41 or other supporting members, to contain the front-to-rear movement of the container 40.

The retainer ridge 34 is high enough to prevent forward movement of the front feet member 41 of the container 40 beyond the front retainer ridge 34. Likewise, the rear retainer ridge 38 is high enough to prevent rearward movement of the rear feet 41 of the container 40 beyond the rear retainer ridge 38.

On the other hand, the retainer ridges 34 and 38 are not so high that the tines 42 of a forklift member 43 will be obstructed in the passage of the tines 42 between the feet 41 and beneath the basket or container 40, as best disclosed in FIG. 2.

The retainer ridges 34 and 38 are also preferably arcuate in cross section and convex upward, to cam or deflect upward the tines 42 of a forklift apparatus 43, which may inadvertently protract, or move rearwardly, low enough to engage the front retainer ridge 34, or the rear retainer ridge 38.

The depending front apron 35 functions as a shield to prevent the tines 42 from penetrating the mesh of wire rods 27 and 28 of the deck member 25, or from damaging the front offset beam 18, if the tines 42 are protracted toward the deck member 25 at too low an elevation.

In the preferred form of the invention, the front retainer sheet 32 is preferably formed of a unitary sheet of material, such as steel, so that the top bearing surface 33, the retainer ridge 34 and the apron 35 are all integral. In the same manner, the rear retainer sheet 36 is also preferably made of a single sheet of material, such as steel, so that the top bearing surface 37, the rear retainer ridge 38 and the rear apron 39 are also all integrally formed in the same rear sheet member 36.

Figure 4:
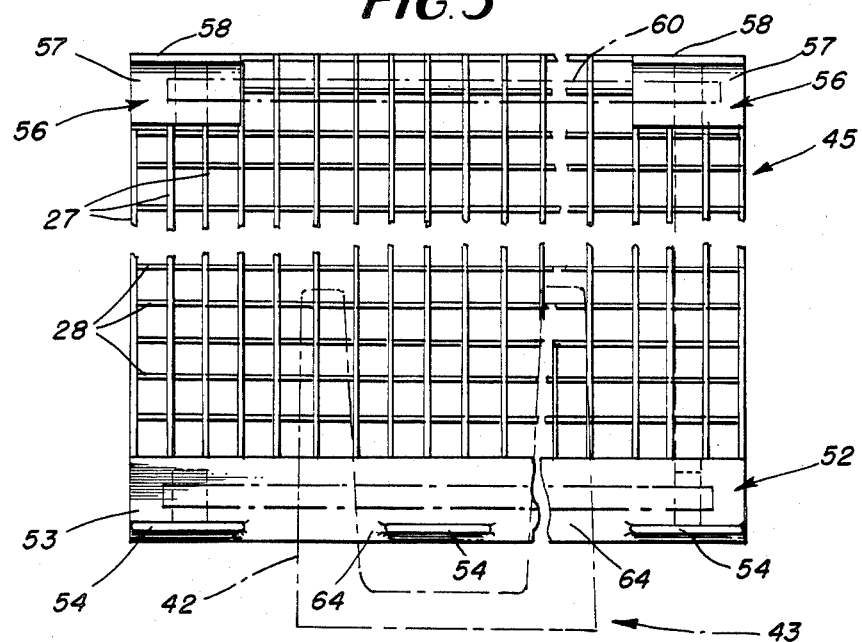
FIG. 4 is a top plan view of a modified deck member, with forklift tines disclosed in a loading position, in phantom.
Figure 5:
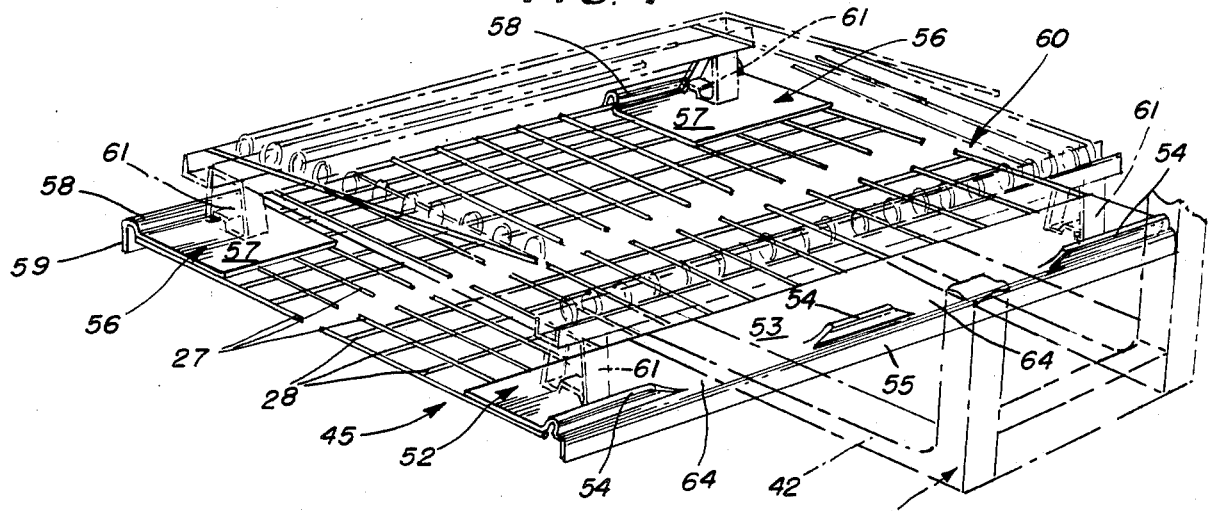
FIG. 5 is a top front perspective view of the modified deck member disclosed in FIG. 4, supporting a wire container with its walls collapsed.

FIGS. 4 and 5 disclose a modified deck member 45 incorporating the same wire mesh structure as the deck member 25, and including the longitudinal wire rods 27 and the transverse wire rods 28.

However, the front retainer sheet member 52 differs from the front retainer sheet member 32 in that the front retainer ridge 54 is made in longitudinally spaced sections, or is interrupted by spaces 64, which are co-planar with the top bearing surface 53. The front retainer sheet member 52 has a front apron 55 substantially identical to the front apron 35 of the front sheet member 32.

The purpose of the interrupted front retainer ridges 54 is to provide the spaces 64 over which the tines 42 may move beneath a wire container basket 60, or other load container, having a lower bottom surface. The spaces 64 assure clearance for the forklift tines 42 between the bottom of the wire container 60 and the top of the deck member 45.

Otherwise, the front retainer sheet member 52 is substantially identical to the front retainer sheet member 32.

The rear retainer sheet member 56 is substantially identical to the rear retainer sheet member 36, except that the rear retainer sheet member 56, disclosed in FIGS. 4 and 5, is formed in two smaller or corner sections. Accordingly, the rear retainer sheet sections 56 do not extend continuously across the rear portion of the deck member 45. The only purpose for making the sheet member 56 in two sections is to eliminate unnecessary metal or material in the fabrication of the sheet member 56 and to provide just sufficient top bearing surfaces 57 to support the rear feet 61 on the rear corners of the wire container 60. Such a construction for the rear retainer sheet member 56 is adequate where the container 60 to be supported on the base member 45 is provided with corner or point contact bearing surfaces, such as the feet 61 as opposed to a continuous bar or rail extending across the rear of the bottom of the container.

Otherwise, the structure and function of the rear retainer sheet member 56 is identical to the structure and function of the rear retainer sheet 36. The rear retainer sheet member sections 56 include the top bearing surfaces 57 which are coplanar with the front bearing surface 53, and also include the rear retainer ridges 58 and the rear aprons 59, of the same shape and construction as those of the rear retainer sheet member 36.

The front retainer sheet member 52 and the rear retainer sheet member 56 are fixed, such as by welding, to the top surfaces of the longitudinal wire rods 27 in such a manner that the interrupted front retainer ridges 54 are spaced from the rear retainer ridge sections 58 a distance slightly greater than the distance between the outer extremities of the feet 61. Thus, the feet 61 may be positioned upon their respective bearing surfaces 53 and 57 and between the retainer ridges 54 and 58 to limit the forward and rearward movement of the container 60 upon the shelf or deck member 45.

It will be understood that the deck member 25 could include either of the sheet members 52 or 56 in place of the corresponding sheet member 32 or 36, respectively, if desired.

It will therefore be apparent that the deck members 25 and 45 made in accordance with this invention solve the problem of inadvertent forward or rearward shifting of loads and containers in storage racks 10 resulting from various causes, and resulting in unstable, tilted or even falling containers and/or spilled contents, by providing spaced retainer ridges 34–38, 54–58 for limiting the forward and rearward movements of the containers 40 and 60, respectively, supported upon the deck members 25 and 45.

What is claimed is:

1. An automated storage and retrieval system comprising:

(a) an open storage rack having longitudinally spaced front and rear transverse support beams and a deck member spanning said support beams, (b) a storage container comprising a bottom portion and longitudinally spaced front and rear support members having front and rear extremities, respectively, said front and rear support members having bottom support surfaces spaced below said bottom portion, (c) an automated forklift device having tines for engaging said bottom portion of said storage container, (d) said deck member comprising a shelf member having front and rear end portions and a plurality of transversely spaced, longitudinal wire rods having top surfaces extending front-to-rear and adapted to span said pair of longitudinally spaced front and rear transverse support beams, (e) an elongated front unitary retainer sheet member having a solid front planar top surface transversely spanning said front end portion of said shelf member and fixed to the top surfaces of said wire rods, (f) said front unitary retainer sheet member further comprising an elongated front ridge member formed integrally from said front retainer sheet member, projecting upwardly from said front planar top surface, and extending transversely of said front retainer sheet member, (g) an elongated rear unitary retainer sheet member having a solid rear planar top surface transversely spanning at least the rear portions of some of said wire rods and fixed to the top surfaces of said wire rods, (h) said rear retainer sheet member further comprising an elongate rear ridge member formed integrally from said rear retainer sheet member, projecting upwardly from said rear planar top surface, and extending transversely of said rear retainer sheet member, (i) said front and rear ridge members being spaced apart longitudinally a distance slightly greater than the front-to-rear spacing of said front and rear extremities of said front and rear support members is an operative position in which said support members are contained between said front and rear ridge members against front-to-rear movement, (j) said front planar top surface extending rearwardly from said front ridge member and said rear planar top surface extending forwardly from said rear ridge member, sufficient distances to provide front and rear bearing surfaces for said corresponding bottom support surfaces of said corresponding front and rear support members in said operative position, (k) each of said front and rear ridge members having a height above said corresponding planar top surface sufficient to limit the longitudinal movement of said support members on said bearing surfaces in said operative position beyond said respective ridge members, the height of said ridge members being less than the vertical distance between said planar top surfaces and the bottom portion of said container to permit the passage of said tines over said corresponding ridge member and beneath said bottom portion in said operative position, (l) each of said front and rear ridge members having an arcuate cross-section, convex upward to define a cam surface extending upward from said planar top surface to deflect upward said tines of said forklift device engaging said cam surface.

2. The invention according to claim 1 in which said longitudinally spaced distance between said front and rear ridge members is great enough to permit engagement of the front extremity of the front support member against said front ridge member and engagement of the rear extremity of the rear support member against said rear ridge member, when the storage container is in said operative position.

3. The invention according to claim 2 in which said front sheet member has a front edge and said cam surface comprises the front surface of said front ridge member, said cam surface being spaced longitudinally behind said front edge.

4. The invention according to claim 3 further comprising a transversely extending, substantially vertically disposed front shield member depending from said front edge below said top planar surface of said front sheet member and in front of said longitudinal wire rods.

5. The invention according to claim 1 further comprising longitudinally spaced transverse wire rods fixed to and beneath said longitudinal wire rods.

6. The invention according to claim 1 in which said front ridge member comprises a plurality of transversely spaced and aligned front ridge members, said spaces between said front ridge members being spaced apart the same distance as the spacing between the tines of a forklift device adapted to position said storage container on said shelf member in said operative position, so that the tines may move longitudinally within said spaces between said front ridge members.

* * * * *